(12) United States Patent
Nishikawa et al.

(10) Patent No.: US 10,518,642 B2
(45) Date of Patent: Dec. 31, 2019

(54) VEHICLE INTERIOR COMPONENT AND METHOD FOR PRODUCING SAME

(71) Applicant: CALSONIC KANSEI CORPORATION, Saitama (JP)

(72) Inventors: Takashi Nishikawa, Saitama (JP); Hiroshi Enatsu, Saitama (JP); Takashi Takahashi, Saitama (JP)

(73) Assignee: CALSONIC KANSEI CORPORATION, Saitama (JP)

( * ) Notice: Subject to any disclaimer, the term of this patent is extended or adjusted under 35 U.S.C. 154(b) by 0 days.

(21) Appl. No.: 15/764,640

(22) PCT Filed: Sep. 9, 2016

(86) PCT No.: PCT/JP2016/076618
§ 371 (c)(1),
(2) Date: Mar. 29, 2018

(87) PCT Pub. No.: WO2017/056923
PCT Pub. Date: Apr. 6, 2017

(65) Prior Publication Data
US 2018/0272868 A1    Sep. 27, 2018

(30) Foreign Application Priority Data

Sep. 29, 2015 (JP) .................. 2015-191569

(51) Int. Cl.
| | |
|---|---|
| B32B 3/06 | (2006.01) |
| B60K 37/00 | (2006.01) |
| B32B 3/02 | (2006.01) |
| B60R 13/02 | (2006.01) |

(52) U.S. Cl.
CPC ............. *B60K 37/00* (2013.01); *B32B 3/02* (2013.01); *B60R 13/0256* (2013.01); *B60R 13/0262* (2013.01); *B32B 3/06* (2013.01)

(58) Field of Classification Search
CPC .. B32B 3/06; B32B 3/266; B32B 7/14; B32B 2309/68; B60R 13/02; B29C 2791/006; B29C 65/48
See application file for complete search history.

(56) References Cited

U.S. PATENT DOCUMENTS

| | | |
|---|---|---|
| 5,863,062 A | 1/1999 | Harada et al. |
| 6,265,044 B1 | 7/2001 | Furuya |

FOREIGN PATENT DOCUMENTS

| | | |
|---|---|---|
| EP | 0 819 584 | 1/1998 |
| GB | 2 334 475 | 8/1999 |
| JP | 54-169178 | 11/1979 |
| JP | 57-51417 | 3/1982 |
| JP | 57-150524 | 9/1982 |

(Continued)

OTHER PUBLICATIONS

International Search Report dated Nov. 29, 2016 in International (PCT) Application No. PCT/JP2016/076618.

*Primary Examiner* — Alexander S Thomas
(74) *Attorney, Agent, or Firm* — Wenderoth, Lind & Ponack, L.L.P.

(57) ABSTRACT

A vehicle interior component includes a base member, a cover member, and an adhesive layer applied to the base member or the cover member. The cover member and the base member are attached via the adhesive layer. On corners of the base member and in the vicinity of the corners, the base member includes non-adhesive portions where an adhesive is not applied.

8 Claims, 9 Drawing Sheets

(56) References Cited

FOREIGN PATENT DOCUMENTS

| | | |
|---|---|---|
| JP | 60-34846 | 2/1985 |
| JP | 62-198443 | 9/1987 |
| JP | 11-286050 | 10/1999 |
| JP | 2000-343594 | 12/2000 |

VEHICLE INTERIOR COMPONENT AND METHOD FOR PRODUCING SAME

The present application is based on and claims priority from Japanese Patent Application No. 2015-191569, filed on Sep. 29, 2015, the disclosure of which is hereby incorporated by reference in its entirety.

TECHNICAL FIELD

This disclosure relates to a vehicle interior component and a method for producing the vehicle interior component.

BACKGROUND ART

A vehicle such as an automobile includes an interior component (a vehicle interior component) such as an instrument panel provided in the front position of a vehicle cabin. As an example of such an interior component, there is an interior component which is produced by placing a heated cover member on the upper surface of a base member to which an adhesive is applied and by performing vacuum suction to attach the cover member to the base member (See, JP S60-34846A, for example).

SUMMARY

However, the vehicle interior component and the method for producing the component disclosed in JP S60-34846A have the following issues.

Specifically, when performing the vacuum suction to the cover member relative to the upper surface of the base member, portions of the cover member which contact corners of the base member may be locally elongated and torn so as to deteriorate the appearance of the interior component.

Therefore, an object of this disclose is to solve the above issues.

To overcome the above issues, a vehicle interior component according to this disclosure includes a base member comprising a first surface, a second surface adjacent to the first surface, and a corner formed in a boundary between the first surface and the second surface. A cover member is placed on the base member, an adhesive layer is applied to the base member, and the base member and the cover member are attached to each other via the adhesive layer. A non-adhesive portion is provided on the corner, a part of the first surface is continuously formed with the corner, a part of the second surface is continuously formed with the corner, and the adhesive layer is provided on another part of the first surface and another part of the second surface.

DETAILED DESCRIPTION

Hereinafter, an embodiment will be described with reference to the accompanying drawings.

FIG. 1 to FIG. 16 and FIG. 19 illustrate the embodiment.

First Embodiment (Configuration) The configuration of the embodiment will be described.

Figure 1:
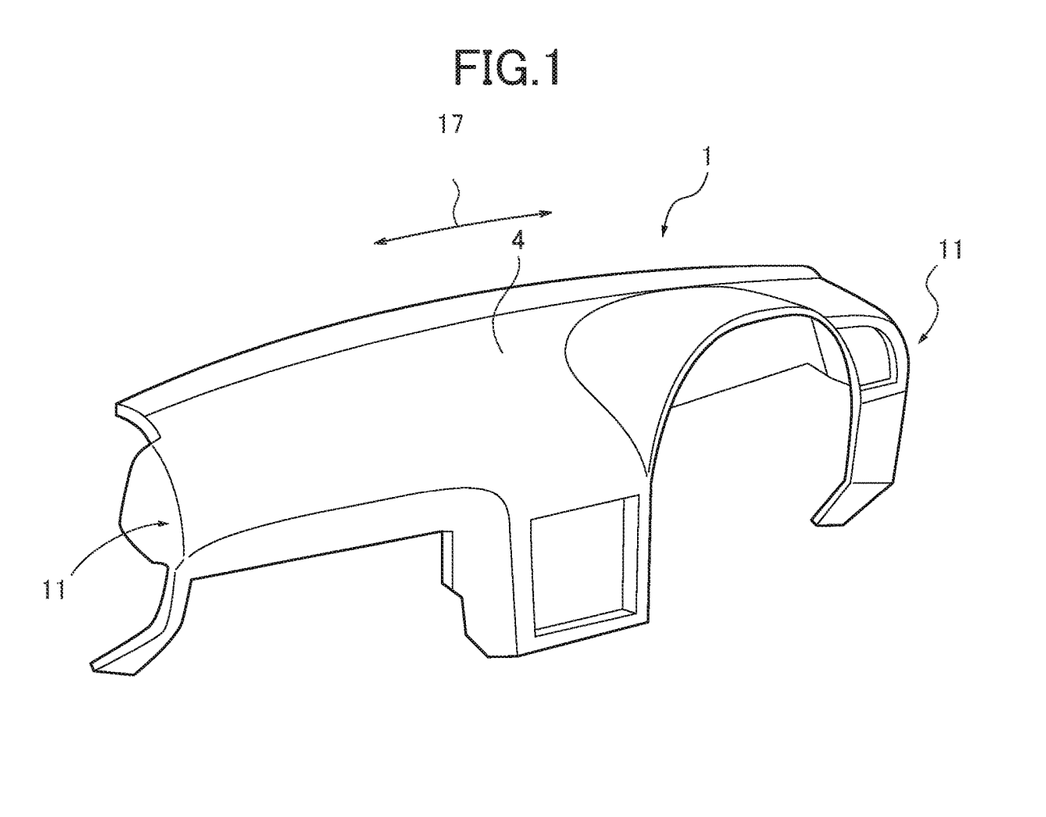
FIG. 1 is an overall view of a vehicle interior component according to an embodiment.
Figure 2:
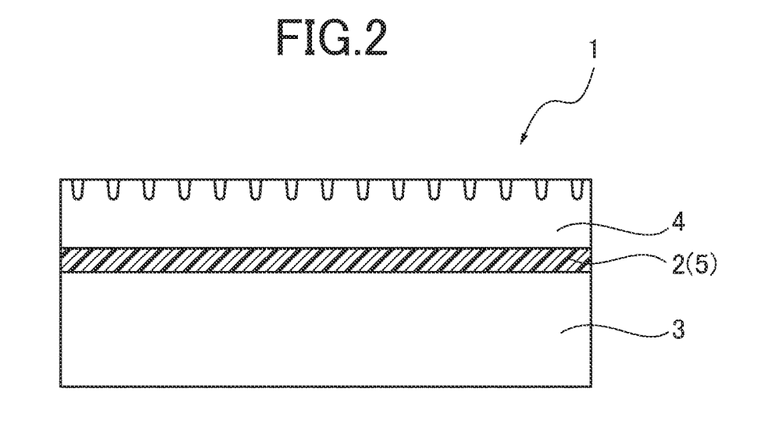
FIG. 2 is a side cross-sectional view of the vehicle interior component shown in FIG. 1.

A vehicle such as an automobile includes an interior component (a vehicle interior component 1) such as an instrument panel shown in FIG. 1, which is provided in the front position of a vehicle cabin. A vehicle interior component, which is used as the vehicle interior component 1, includes a base member 3, a cover member 4 placed on the base member, and an adhesive layer 5 (or an adhesive applied layer) applied to the base member 3 or the cover member 4 as shown in FIG. 2. The vehicle interior component 1 is formed by placing the (heated) cover member 4 on the base member 3 via an adhesive layer 5, and by performing vacuum suction (simultaneous vacuum suctioning and compression bonding) such that the cover member 4 is attached to the base member 3.

In this embodiment, the vehicle interior component 1 is described as an example of the instrument panel but not limited to the instrument panel. A heat-activated adhesive or the like is used as an adhesive 2. The adhesive layer 5 is formed by applying the adhesive 2 either on the upper surface of the base member 3 or on the bottom surface of the cover member 4 to have a predetermined thickness. The base member 3 is made of a hard resin. The cover member 4 is made of a soft resin.

In addition to the fundamental configuration described above, following elements are provided in this embodiment.

Figure 3:
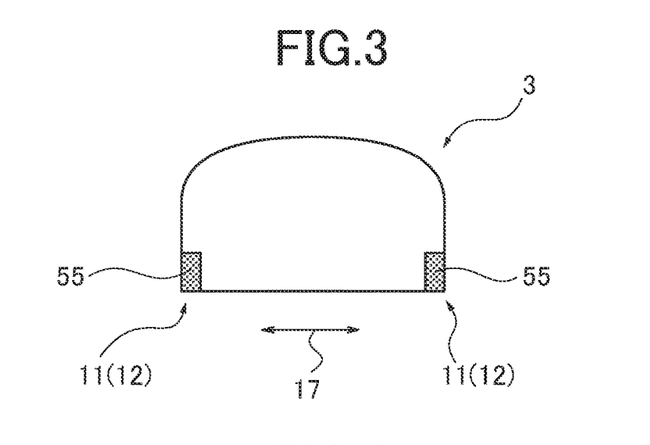
FIG. 3 is a plan view illustrating a base member which is masked (illustrating a masking step).
Figure 4:
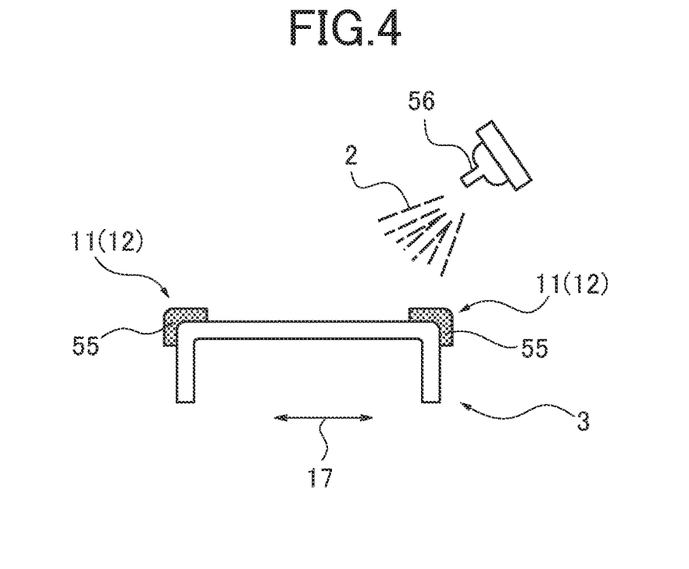
FIG. 4 is a view illustrating a state in which an adhesive is applied to the masked base member (illustrating an adhesive applying step).
Figure 5:
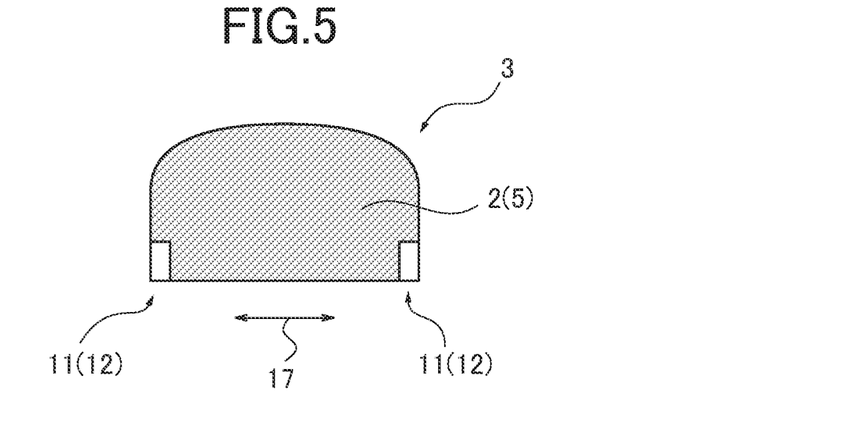
FIG. 5 is a plan view illustrating the base member including non-adhesive portions.

(1) As shown in FIGS. 3 to 5, non-adhesive portions 12 (or non-attaching portions) are provided on corners 11 of the base member 3 and in the vicinity of the corners 11. The non-adhesive portions 12 are areas where the adhesive 2 is not partially applied in the base member 3.

In the case of the instrument panel, the corners 11 of the base member 3 are formed in a boundary between an upper side and a side facing occupants (a vehicle rear side) of the instrument panel. In this embodiment, the corners are located in both ends of the boundary in a vehicle width direction 17 and the like.

In addition to the corners 11 of the base member 3, the non-adhesive portions 12 may be formed in other areas where the elongation and the breakage of the cover member 4 may be occurred.

Figure 6:
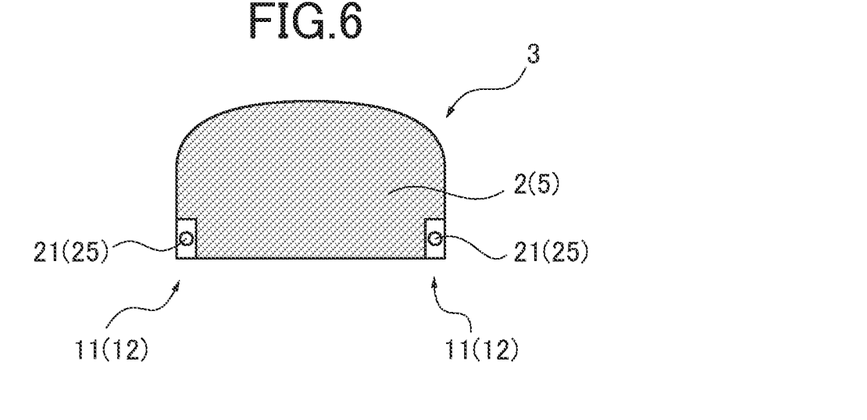
FIG. 6 is a plan view, which is similar to FIG. 5, illustrating the base member including air holes.
Figure 7:
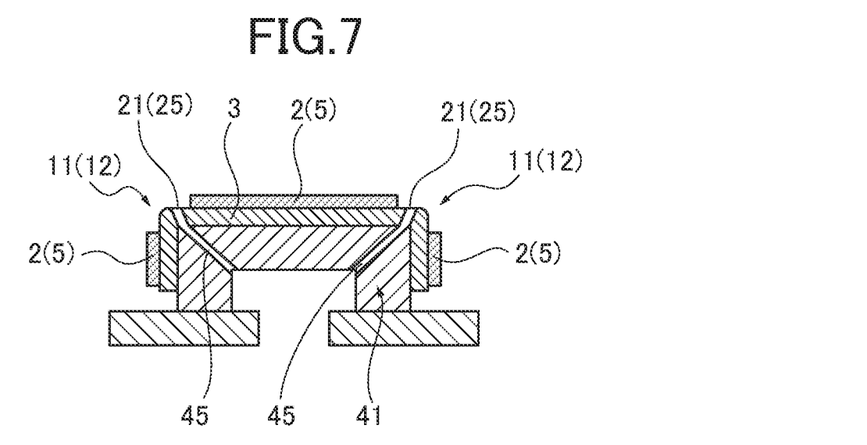
FIG. 7 is a view illustrating a state in which the base member including the non-adhesive portions and the air holes is set to a mold (illustrating a base member setting step).

(2) As shown in FIGS. 6 and 7, the base member 3 includes air holes 21 in the non-adhesive portions 12.

Figure 8:
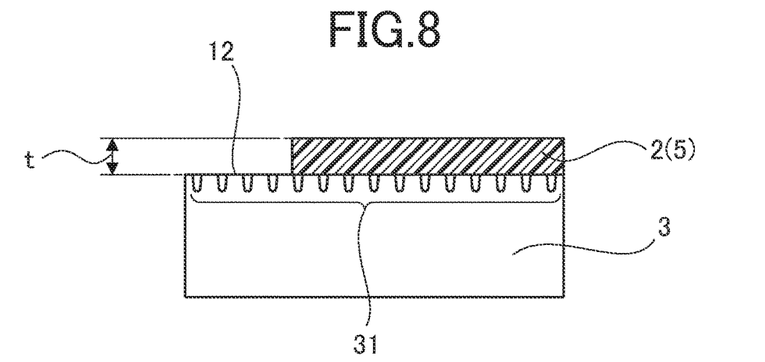
FIG. 8 is a cross-sectional view of the base member illustrating the layer thickness of an adhesive layer.

Each of the air holes 21 is a through hole for removing air. One or more air holes can be provided in each of the non-adhesive portions 12 in accordance with the size and/or shape of the non-adhesive portion 12. The air holes 21 may be formed at the same time when the base member 3 is molded, or may be formed by post-processing after the formation of the base member 3 and before the simultaneous vacuum suctioning and compression bonding. Preferably, the air holes 21 are simultaneously formed with vacuum suction holes 25 since the vacuum suction holes 25 are formed in the base member 3 for the simultaneous vacuum suctioning and compression bonding in advance. Alternatively, a part of the vacuum suction hole 25 may be used as the air hole 21. Preferably, the air holes 21 are necessarily provided when the layer thickness t of the adhesive 2 (the adhesive layer 5) is larger than about 75 μm as shown in FIG. 8.

Figure 9:
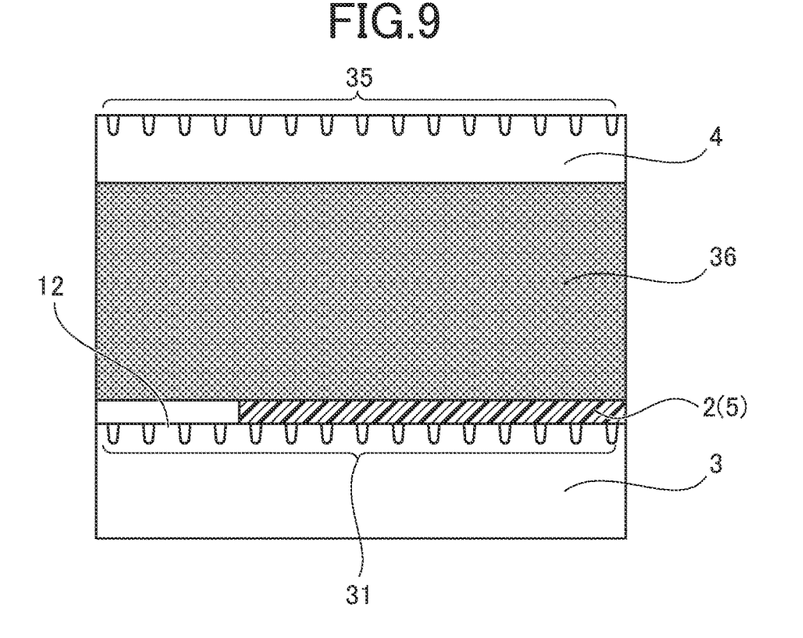
FIG. 9 is a view illustrating a fine concave-convex portion provided in the non-adhesive portion.

(3) As shown in FIG. 9, the base member 3 includes a fine concave-convex portion 31 in the non-adhesive portions 12 to improve slidability (lubricity).

Preferably, the fine concave-convex portion 31 includes a plurality of smooth concave and convex portions, and each of the concave portions has a round end. The depth of the concave portion is equal to or less than about 0.3 mm, preferably equal to or more than 0.05 mm. The planar shape of the fine concave-convex portion 31 may be the same as that of a decorative concave-convex portion 35 such as a grain pattern or a geometric pattern provided on the upper surface of the cover member 4 for decoration or the like. The fine concave-convex portion 31 may be formed entirely on the upper surface of the base member 3, or partially on the upper surface of the base member 3 where the non-adhesive portions 12 are provided or in the vicinity thereof. In this embodiment, the fine concave-convex portion 31 is formed entirely on the upper surface of the base member 3. The fine concave-convex portion 31 may be formed at the same time when the base member 3 is molded, or may be formed by post-processing after the formation of the base member 3 and before the simultaneous vacuum suctioning and compression bonding.

In the embodiment shown in the figures, the cover member 4 has a multilayer configuration in which a foamed layer 36 is integrally provided on the bottom surface side to deteriorate its slidability.

Hereinafter, a method for producing the vehicle interior component 1 will be described.

The method for producing the vehicle interior component includes applying the adhesive 2 to the base member 3 or the cover member 4, and attaching the cover member 4 to the base member 3 by performing vacuum suction after placing the heated cover member 4 on the upper surface of the base member 3.

Figure 10:
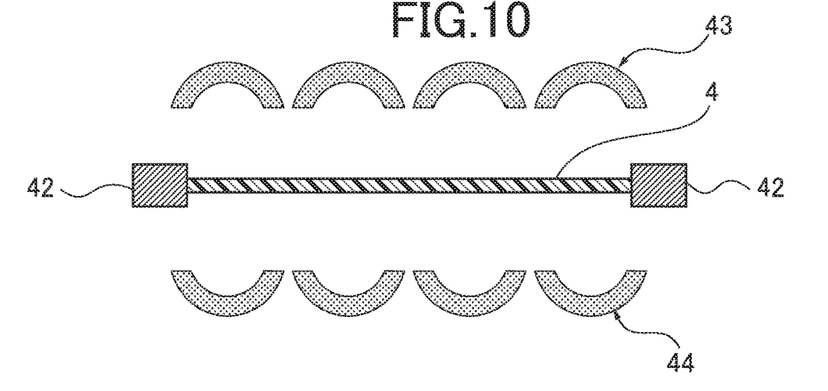
FIG. 10 is a view illustrating a state in which the cover member is heated (illustrating a cover member heating step).
Figure 11:
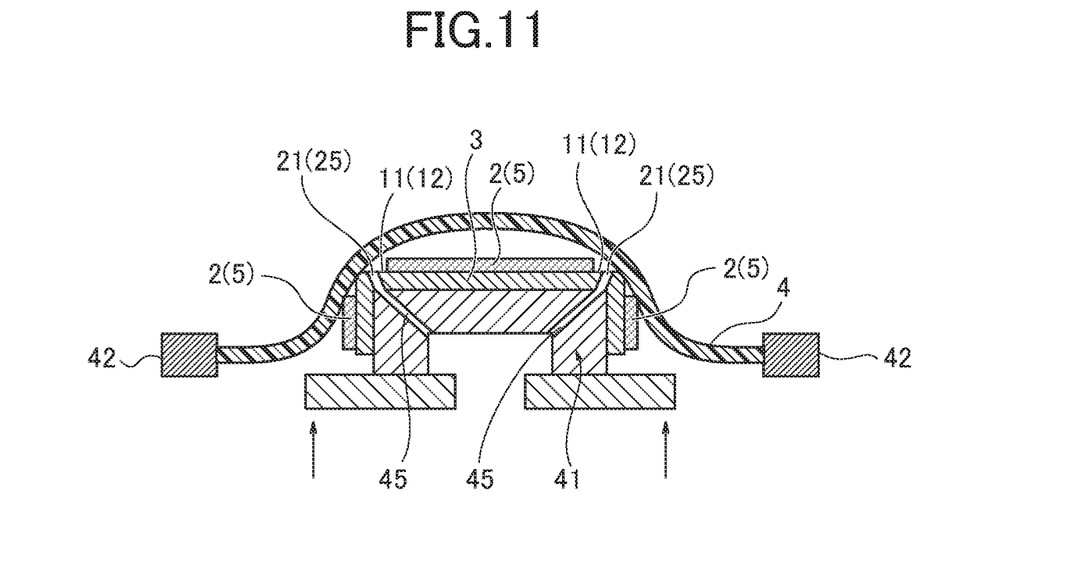
FIG. 11 is a view illustrating a state in which the base member is pushed toward the cover member (illustrating a mold pushing step).
Figure 12:
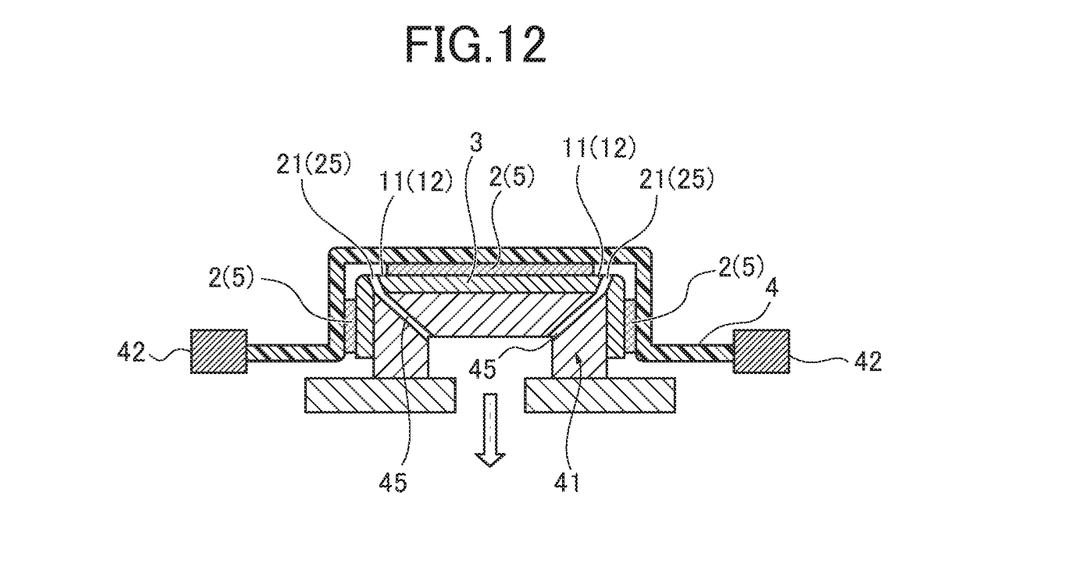
FIG. 12 is a view illustrating a state in which vacuum suction is performed (illustrating a vacuum suctioning step).

The base member 3 applied with the adhesive 2 shown in FIG. 5 is set to a mold 41 (a mold for the base member) as shown in FIG. 7. The cover member 4 is clamped by clamps 42, and the upper and bottom surfaces of the cover member 4 are heated by heaters 43, 44 provided above and below the cover member 4 as shown in FIG. 10. Then, the cover member 4 is placed above the base member 3 as shown in FIG. 11. Subsequently, the mold 41 together with the base member 3 is pushed up such that the base member 3 contacts the cover member 4 and then the vacuum suction is performed by evacuating the mold 41 as shown in FIG. 12. The vacuum suction holes 25, 45 are formed in the base member 3 and the mold 41 in advance.

(4) The method for producing the vehicle interior component includes, on the corners 11 of the base member 3 or the cover member 4 to which the adhesive 2 is applied and in the vicinity of the corners 11, providing the non-adhesive portions 12 which are areas where the adhesive 2 is not applied in the base member 3 or the cover member 4 such that the non-adhesive portions 12 prevent the cover member 4 from being attached to the base member 3 in the non-adhesive portions 12 to reduce the local elongation of the cover member 4 in the non-adhesive portions 12 and to prevent the breakage or torn of the cover member 4 due to the local elongation of the cover member 4.

Figure 13:
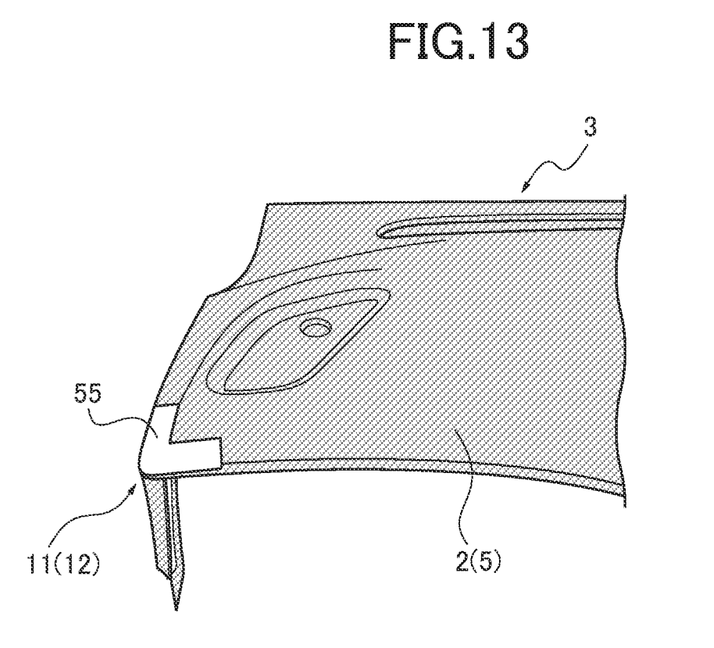
FIG. 13 is a view illustrating the base member which is masked on the left corner.
Figure 14:
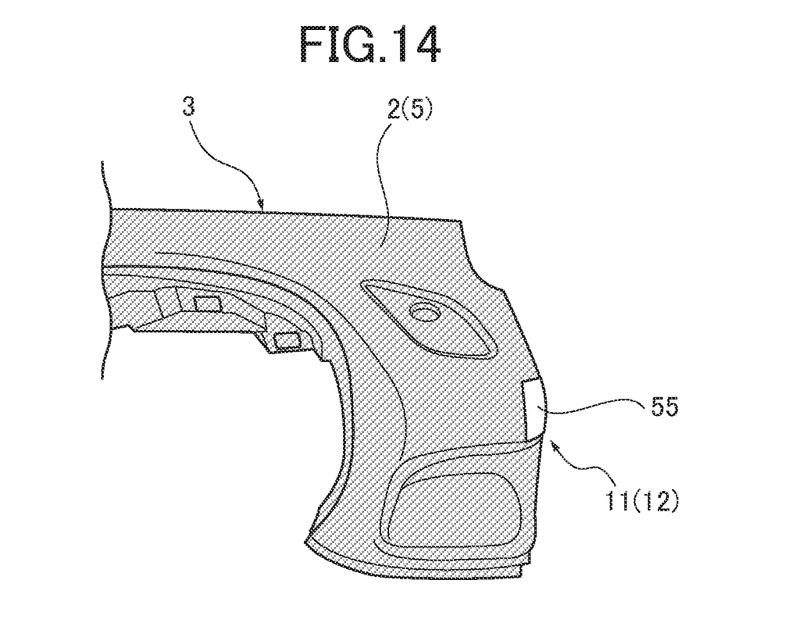
FIG. 14 is a view illustrating the base member which is masked on the right corner.
Figure 15:
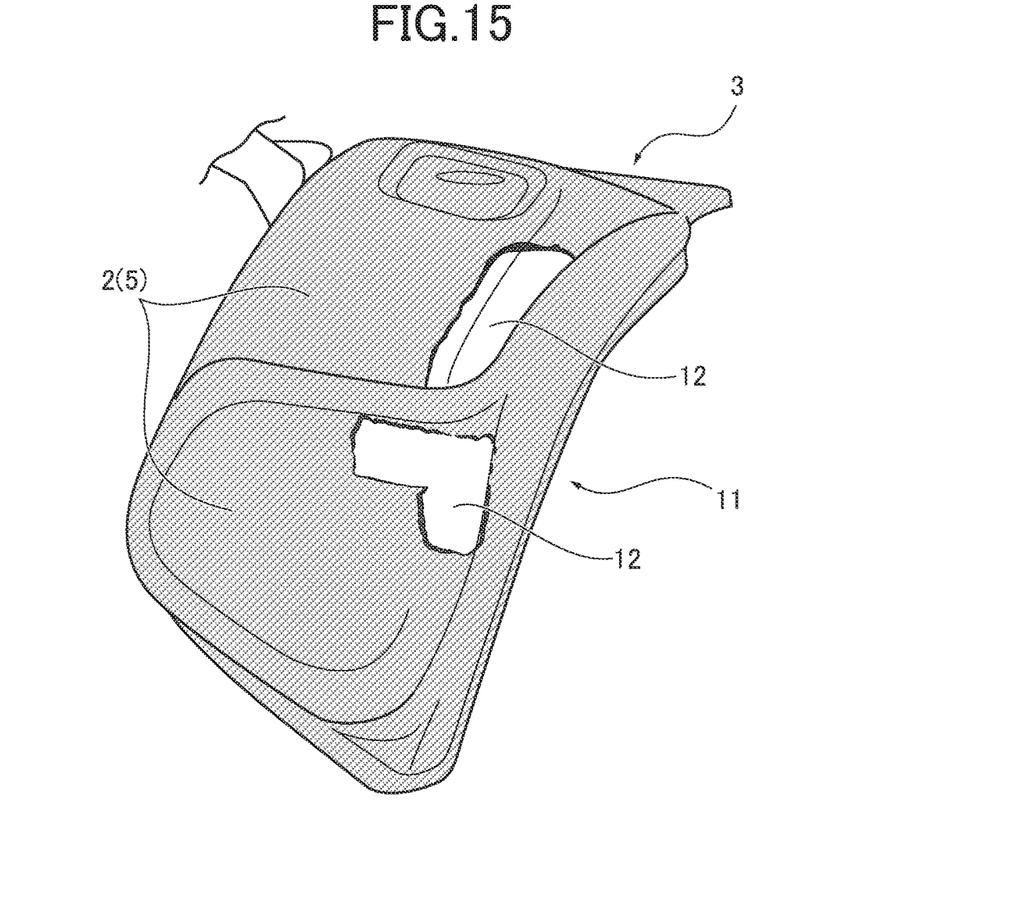
FIG. 15 is a view illustrating the base member of FIG. 14 after a masking tape is peeled.

Specifically, as shown in FIGS. 13 and 14, the non-adhesive portions 12 are formed, for example, by applying masking tape 55 to the corners 11 of the base member 3 and then applying the adhesive 2 over it. The masking tape 55 is peeled after applying the adhesive 2 as shown in FIG. 15.

Figure 16:
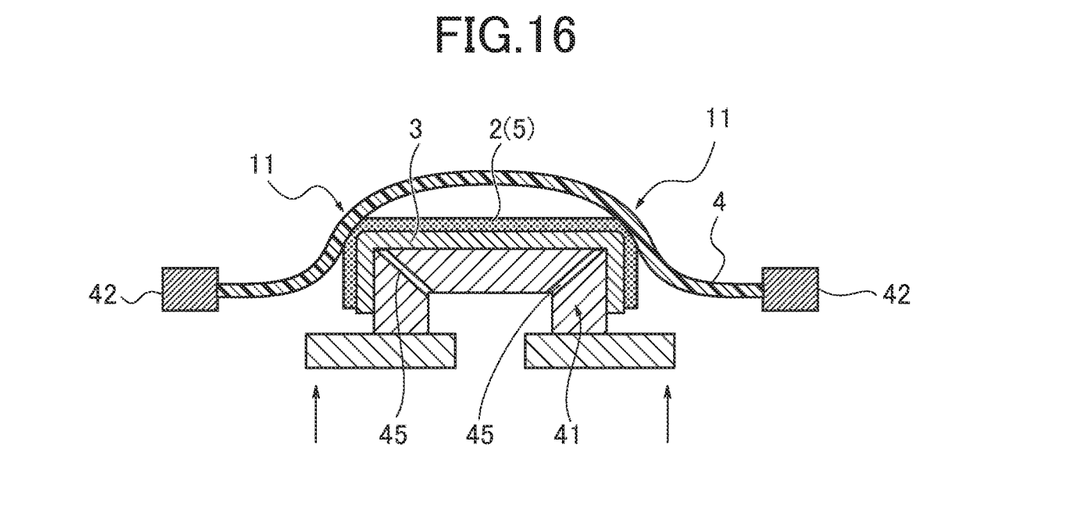
FIG. 16 is a view illustrating a state in which the base member including no non-adhesive portion is pushed toward the cover member.
Figure 17:
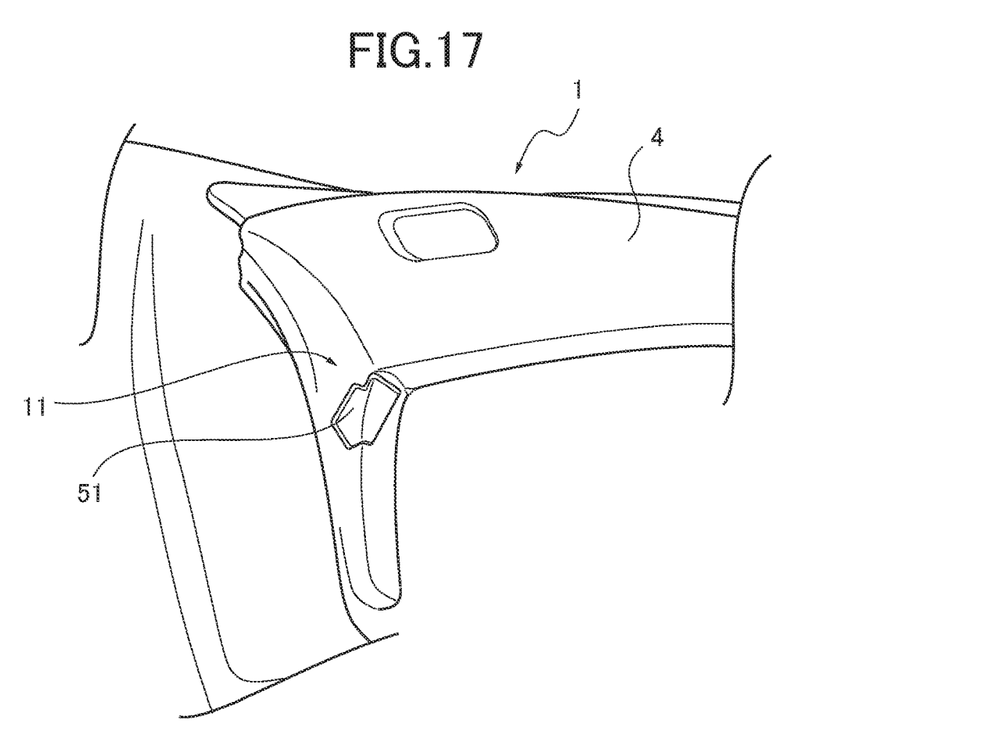
FIG. 17 is a view illustrating the cover member which is torn on the left corner of FIG. 16.
Figure 18:
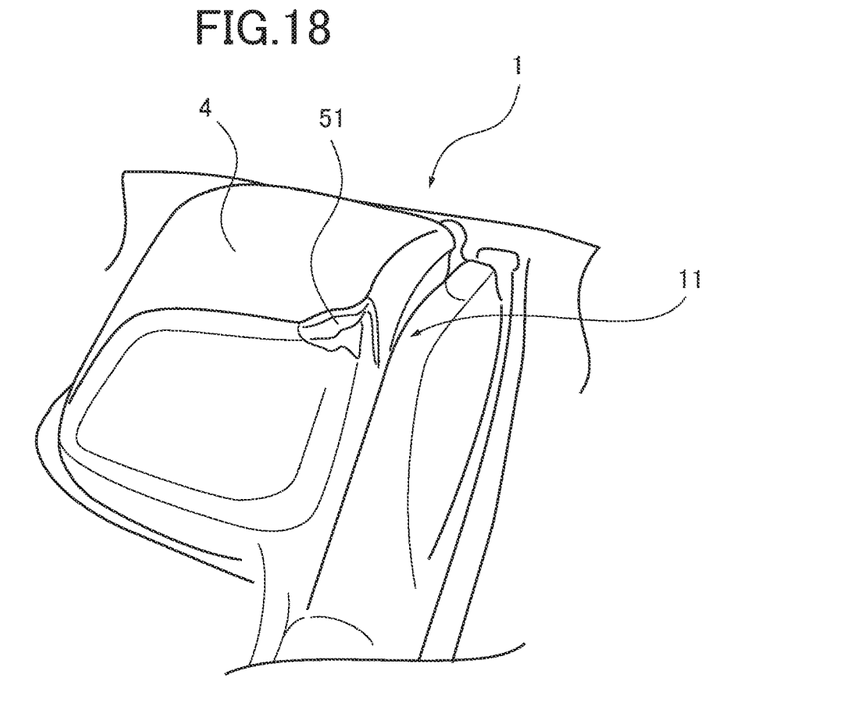
FIG. 18 is a view illustrating the cover member which is torn on the right corner of FIG. 16.
Figure 19:
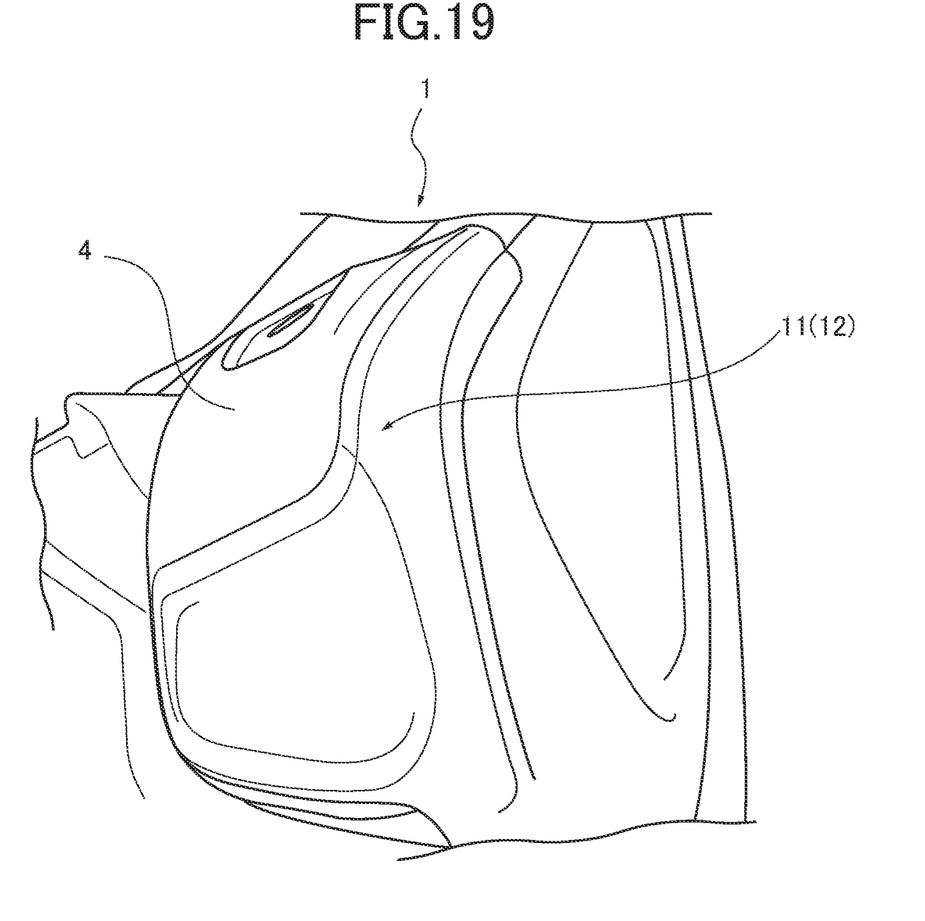
FIG. 19 is a view illustrating the right corner of the cover member according to the embodiment in which the non-adhesive portions are provided.

As shown in FIG. 16, when the mold 41 together with the base member 3 is pushed up so that the base member 3 contacts the cover member 4 without providing the non-adhesive portions 12, the viscosity of the adhesive 2 applied to the base member 3 suppresses the slidability of the cover member 4 relative to the base member 3 (the corners 11), resulting in the breakage (a torn portion 51) of the cover member 4 due to the local elongation as shown in FIGS. 17 and 18. On the other hand, in the embodiment with the non-adhesive portions 12, the cover member 4 is not torn and has a better appearance as shown in FIG. 19 since the suppression of the slidability is eliminated.

(5) The air holes 21 are provided in the non-adhesive portions 12 of the base member 3 such that air, which may be (would be otherwise) within the non-adhesive portions 12, can escape through the air holes 21 when the base member 3 and the cover member 4 are attached.

(6) Further, the fine concave-convex portion 31 is provided in the non-adhesive portions 12 of the base member 3 such as to improve slidability of the cover member 4 relative to the non-adhesive portions 12 of the base member 3 (when pushing up the mold and/or performing the vacuum suction).

More specifically, in the method for producing the vehicle interior component, as shown in FIG. 3, the corners 11 of the base member 3 are masked with the masking tapes 55 or masking tools (a masking step) as an adhesive applying step. In this state, as shown in FIG. 4, the adhesive 2 is applied to the upper surface of the base member 3. Thereby, on the upper surface of the base member 3, a layer of the adhesive 2 (the adhesive layer 5) and the non-adhesive portions 12 where the adhesive 2 is not applied because of the masking are formed as shown in FIG. 5.

The adhesive 2 is entirely sprayed to the upper surface of the base member 3 by using a spray nozzle 56 or the like.

The non-adhesive portions 12 are formed only by taping the masking tapes 55 or placing masking members to the upper surface of the base member 3.

Note that the air holes 21 and the fine concave-convex portion 31 are provided before the adhesive applying step.

Then, with the base member 3 as described above, the simultaneous vacuum suctioning and compression bonding is performed.

Specifically, in a base member setting step, the base member 3 is set to the mold 41 as shown in FIG. 7. Further, in a cover member heating step, the cover member 4 clamped with the clamps 42 is heated by the heaters 43, 44 from above and below as shown in FIG. 10. Then, in a mold pushing step, the heated cover member 4 is placed above the base member 3 which is set to the mold 41 as shown in FIG. 11, and the base member 3 together with the mold 41 is pushed toward the cover member 4.

Further, in a vacuum suctioning step, the vacuum suction is performed on the cover member 4 relative to the base member 3 via the mold 41 and the base member 3 as shown in FIG. 12. Thereby, the cover member 4 is attached to the base member 3 and accordingly the vehicle interior component 1 is produced.

(Operational Effect) According to the embodiment, following operational effects can be obtained.

(Operational Effect I)

The vehicle interior component 1 includes the adhesive layer 5 applied to the base member 3 or the cover member 4. The vehicle interior component 1 is produced by placing the (heated) cover member 4 on the base member 3 via the adhesive layer 5, and then by performing vacuum suction thereto (the cover member 4 is attached to the base member 3).

The non-adhesive portions 12 are formed on the corners 11 of the base member 3 and in the vicinity of the corners 11. The non-adhesive portions 12 are areas where the adhesive 2 is not partially applied in the base member 3. This prevents the cover member 4 from being attached to the base member 3 in the non-adhesive portions 12 around the corners 11 of the base member 3 when the base member 3 and the cover member 4 are attached. Thereby, the local elongation of the cover member 4 in the non-adhesive portions 12 can be reduced and the breakage of the cover member 4 due to the local elongation of the cover member 4 can be prevented. As a result, an appearance defection such as the breakage of the cover member 4 can be eliminated and accordingly the vehicle interior component 1 can be produced with high quality and high yield ratio. Moreover, this can be achieved by adding the masking step to the adhesive applying step relative to the base member 3. Therefore, the process is not significantly changed and the burden of workers is not significantly increased.

Note that, based on the results of various tests, it has been found that the breakage or tearing of the cover member 4 can occur more easily when the cover member 4 is relatively thin and consists of a single layer. The thickness of the cover member 4 which breaks more easily is less than about 1.5 mm. Accordingly, it is preferable that the cover member 4 is necessarily attached to the base member 3 after providing the non-adhesive portions 12 when using the cover member 4 having the thickness of less than 1.5 mm. The breakage of the cover member 4 may occur in accordance with the shape of the corners 11 or the like even with the cover member 4 having the thickness equal to or larger than 1.5 mm. In this case, it is preferable to provide the non-adhesive portions 12.

(Operational Effect II) The air holes 21 are provided in the non-adhesive portions 12 of the base member 3. The air holes 21 can release a small amount of air which would be otherwise enclosed within the non-adhesive portions 12 when the base member 3 and the cover member 4 are attached. As a result, this prevents occurrence of defects such as formation of boundary line steps or gaps between adhesive portions to which the adhesive 2 is applied and the non-adhesive portions 12 due to the elongation of the cover member 4 which is caused by a small amount of air remaining within a small space in the non-adhesive portions 12 and thermally expanded after the attachment of the base member 3 and the cover member 4, for example. Note that the thermal expansion of a small amount of air remaining within the non-adhesive portions 12 tends to occur, for example, at the time of high temperature in summer and at the time of the heat resistance test after manufacturing the vehicle interior component 1.

The air holes 21 should be provided only when the layer thickness t of the adhesive 2 is relatively large since various tests show that such boundary line steps tend to be formed when the layer thickness t (the dry layer thickness) of the adhesive 2 (the adhesive layer 5) is relatively large but not to be formed when the layer thickness t of the adhesive 2 is relatively small. The layer thickness t of the adhesive 2 which forms the boundary line step is equal to or more than about 75 μm (see FIG. 8). Therefore, the air holes 21 may not be necessarily provided (or may be provided) when the layer thickness t of the adhesive 2 is less than 75 μm.

(Operational Effect III) The fine concave-convex portion 31 is provided in the non-adhesive portions 12 of the base member 3. The fine concave-convex portion 31 decreases frictional resistance between the non-adhesive portions 12 and the cover member 4, and accordingly improves its slidability since the fine concave-convex portion 31 decreases a contact area between the non-adhesive portions 12 and the cover member 4 (the contact becomes close to a point contact, for example). This is particularly effective when the cover member 4 has a multilayer configuration in which the foamed layer 36 deteriorating slidability is provided on the bottom surface of the cover member 4.

Although the embodiment has been described with reference to the drawings, it should be understood that the embodiment is only an example of this disclosure. This disclosure should not be limited to the embodiment, and it should be appreciated that variations or modifications may be made in the embodiments described by persons skilled in the art without departing from the gist of this disclosure. Further, when the embodiment includes a plurality of elements, any possible combinations of these elements may be possible even without a detailed description. Furthermore, when several embodiments are described in this disclosure, any possible combinations of these configurations that may even across these embodiments may be possible even without a detailed description. Additionally, when the term "and the like", is used, it means it covers similar elements. Further, when the terms "substantially", "about", "around", etc. are used, it should be considered that they cover ranges and/or accuracy within a technical common sense understood by persons skilled in the

The invention claimed is:

1. A vehicle interior component comprising:
   a base member comprising a first surface, a second surface adjacent to the first surface, and a corner formed in a boundary between the first surface and the second surface;
   a cover member placed on the base member;

an adhesive layer applied to the base member, the base member and the cover member attached to each other via the adhesive layer; and a non-adhesive portion provided on the corner such that an upper surface of the base member is exposed from the adhesive layer at the corner, a part of the first surface being continuously formed with the corner, and a part of the second surface being continuously formed with the corner, wherein the non-adhesive portion directly contacts the cover member.

2. The vehicle interior component according to claim 1, wherein the base member comprises an air hole in the non-adhesive portion.

3. The vehicle interior component according to claim 2, wherein the base member comprises a fine concave-convex portion in the non-adhesive portion.

4. The vehicle interior component according to claim 1, wherein the base member comprises a fine concave-convex portion in the non-adhesive portion.

5. A method for producing a vehicle interior component comprising:

applying an adhesive to a base member of the vehicle interior component, the base member comprising a first surface, a second surface adjacent to the first surface, and a corner formed in a boundary between the first surface and the second surface;

providing a non-adhesive portion on the corner such that an upper surface of the base member is exposed from the adhesive layer at the corner, a part of the first surface being continuously formed with the corner, and a part of the second surface being continuously formed with the corner; and attaching cover member to the base member by heating the cover member and placing the heated cover member on an upper surface of the base member such that the non-adhesive portion directly contacts the cover member, and by performing vacuum suction to the cover member.

6. The method according to claim 5, further comprising:
providing an air hole in the non-adhesive portion of the base member.

7. The method according to claim 6, further comprising:
providing a fine concave-convex portion in the non-adhesive portion of the base member.

8. The method according to claim 5, further comprising:
providing fine concave-convex portion in the non-adhesive portion of the base member as to improve slidability of the cover member relative to the non-adhesive portion of the base member.

* * * * *